United States Patent
Takazawa (10) Patent No.: US 11,995,434 B2
(45) Date of Patent: May 28, 2024

(54) IMAGE PROCESSING APPARATUS, IMAGE PROCESSING METHOD, AND STORAGE MEDIUM FOR UPDATING SOFTWARE

(71) Applicant: CANON KABUSHIKI KAISHA, Tokyo (JP)

(72) Inventor: Satoshi Takazawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 17/848,430

(22) Filed: Jun. 24, 2022

(65) Prior Publication Data
US 2023/0010685 A1    Jan. 12, 2023

(30) Foreign Application Priority Data
Jul. 1, 2021  (JP) .................................. 2021-110377

(51) Int. Cl.
| | |
|---|---|
| *G06F 9/445* | (2018.01) |
| *G06F 3/12* | (2006.01) |
| *G06F 8/65* | (2018.01) |
| *H04W 8/18* | (2009.01) |
| *H04W 8/20* | (2009.01) |

(52) U.S. Cl.
CPC ............. *G06F 8/65* (2013.01); *G06F 3/1204* (2013.01); *G06F 3/1225* (2013.01); *G06F 3/123* (2013.01); *G06F 3/1287* (2013.01); *H04W 8/183* (2013.01); *H04W 8/205* (2013.01)

(58) Field of Classification Search
CPC ........ G06F 8/65; G06F 3/1204; G06F 3/1225; G06F 3/123; G06F 3/1287; H04W 8/183; H04W 8/205
See application file for complete search history.

(56) References Cited

U.S. PATENT DOCUMENTS 9,063,813 B2    6/2015  Takazawa
9,444,693 B2    9/2016  Takazawa
(Continued)

FOREIGN PATENT DOCUMENTS

JP    H10-289146 A    10/1998

OTHER PUBLICATIONS

Peter Edsbacker, SIM cards for cellular networks, Jun. 12, 2011, [Retrieved on Dec. 19, 2023]. Retrieved from the internet: <URL: https://www.diva-portal.org/smash/get/diva2:423013/ FULLTEXT02> 109 Pages (1-65) (Year: 2011).*

*Primary Examiner* — Anibal Rivera
(74) *Attorney, Agent, or Firm* — Carter, DeLuca & Farrell LLP (57) ABSTRACT

Provided is an image processing apparatus provided with a module that holds identification information capable of specifying a subscriber who has entered a contract for specific mobile communication. The image processing apparatus provides, if software needs to be updated, a message indicating a predetermined time slot and that the image processing apparatus has to be in a state in which downloading software for updating using the specific mobile communication is possible, and downloads the software for updating in the predetermined time slot using the specific mobile communication. The predetermined time slot is at least a portion of a time slot which is determined depending on the contract for the specific mobile communication.

9 Claims, 8 Drawing Sheets

(56) References Cited

U.S. PATENT DOCUMENTS

| | | | |
|---|---|---|---|
| 11,394,834 B2* | 7/2022 | Chan | H04M 15/854 |
| 2005/0060364 A1* | 3/2005 | Kushwaha | H04L 43/0817 |
| | | | 709/200 |
| 2007/0093243 A1* | 4/2007 | Kapadekar | H04M 3/42178 |
| | | | 455/419 |
| 2022/0217526 A1* | 7/2022 | Zheng | H04W 8/183 |

* cited by examiner

IMAGE PROCESSING APPARATUS, IMAGE PROCESSING METHOD, AND STORAGE MEDIUM FOR UPDATING SOFTWARE

BACKGROUND OF THE INVENTION

Field of the Invention

The present invention relates to an image processing apparatus, an image processing method, and a storage medium.

Description of the Related Art

Information processing apparatuses such as smartphones and portable terminals released in recent years can access the Internet through a carrier network through SIM cards mounted in the apparatuses. Here, "SIM" is an abbreviation for "subscriber identity module." Therefore, even in an environment where the Internet is not equipped or the device itself is not connected to the Internet, the Internet can be easily accessed. For example, software may need to be updated due to security issues or bugs in firmware or applications (hereinafter collectively referred to as software). In this case, software of an information processing apparatus can be kept up to date by acquiring and applying information on software updates through a carrier network. In the case of security issues or bugs, it is preferable to update software as soon as possible. Therefore, updating software at the application reservation time as in, for example, Japanese Patent Laid-Open No. H10-289146 or updating software immediately before the power supply of an information processing apparatus is cut off can be considered.

On the other hand, telecommunications corporations called carriers that provide SIM cards often adopt strategies such as lowering communication charges in a late-night time slot when carrier networks are infrequently used for the purpose of increasing the number of customer contracts or the like.

If firmware needs to be updated due to software bugs or security issues like those described above, a manufacturer bearing the communication cost can be considered. In order to lower the communication cost borne by the manufacturer as much as possible, it is necessary to update software, for example, in the late-night time slot when the communication charge is low. However, depending on the information processing apparatus, there is the possibility of the power supply not being turned on during the late-night time slot. In addition, if the technique of Japanese Patent Laid-Open No. H10-289146 is used, software is updated at a timing when a user turns off the power supply, and thus the communication cost cannot be lowered.

SUMMARY OF THE INVENTION

The present invention was contrived in view of such circumstances, and provides an image processing apparatus that updates software while a manufacturer's burden of the communication cost is suppressed.

In order to achieve the above object, according to the present invention, there is provided an image processing apparatus provided with a module that holds identification information capable of specifying a subscriber who has entered a contract for specific mobile communication, the image processing apparatus including: a providing unit configured to provide, if software needs to be updated, a message indicating a predetermined time slot and that the image processing apparatus has to be in a state in which downloading software for updating using the specific mobile communication is possible, and a control unit configured to download the software for updating in the predetermined time slot using the specific mobile communication, wherein the predetermined time slot is at least a portion of a time slot which is determined depending on the contract for the specific mobile communication.

Further features of the present invention will become apparent from the following description of exemplary embodiments (with reference to the attached drawings).

DESCRIPTION OF THE EMBODIMENTS

Hereinafter, preferred embodiments of the present invention will be described with reference to the accompanying drawings. Meanwhile, in the embodiments, an image forming apparatus 102 will be described as an example of an image processing apparatus used in a software update system. Meanwhile, the following embodiments do not limit the present invention according to the appended claims, and not all combinations of features described in the embodiments are essential in solving the means of the present invention. Meanwhile, the same components are denoted by the same reference numerals and signs, and thus description thereof will not be repeated.

First Embodiment

Figure 1:
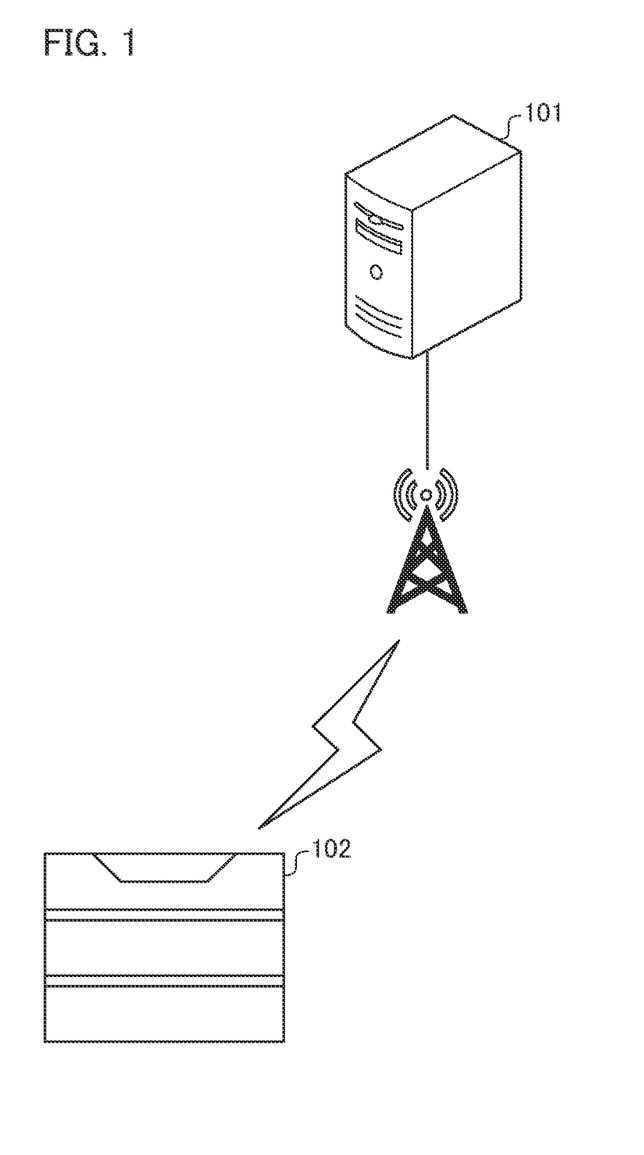
FIG. 1 is a diagram illustrating an example of a configuration of a software update system.

FIG. 1 is a diagram illustrating an example of a configuration of a software update system. The software update system in the present embodiment has a software management server 101 (hereinafter referred to as a management server) that provides services on the Internet. In addition, the software update system has the image forming apparatus 102 that acquires software from the management server 101 through a carrier network.

The management server 101 is a server for managing software to be applied to the image forming apparatus 102. The term "software" refers to firmware or an application that can be applied to the image forming apparatus 102.

The management server 101 provides software in response to an acquisition request from the image forming apparatus 102. Meanwhile, the software which is managed by the management server 101 is not limited to firmware or an application, and may include software setting values or the like.

The image forming apparatus 102 is a multifunction machine having a plurality of functions such as a scanner, a printer, a facsimile, and a file transmission function integrated into a copying machine. By applying the software which is managed by the management server 101, the image forming apparatus 102 can enable functions that cannot be used in an initial state or additional functions based on an application. In addition, the image forming apparatus 102 has a SIM card mounted inside, and can access the management server 101 on the Internet through a carrier network. That is, the image forming apparatus 102 in the present embodiment functions as an example of an image processing apparatus provided with a module that holds identification information capable of specifying a subscriber who has entered a contract for specific mobile communication.

Figure 2:
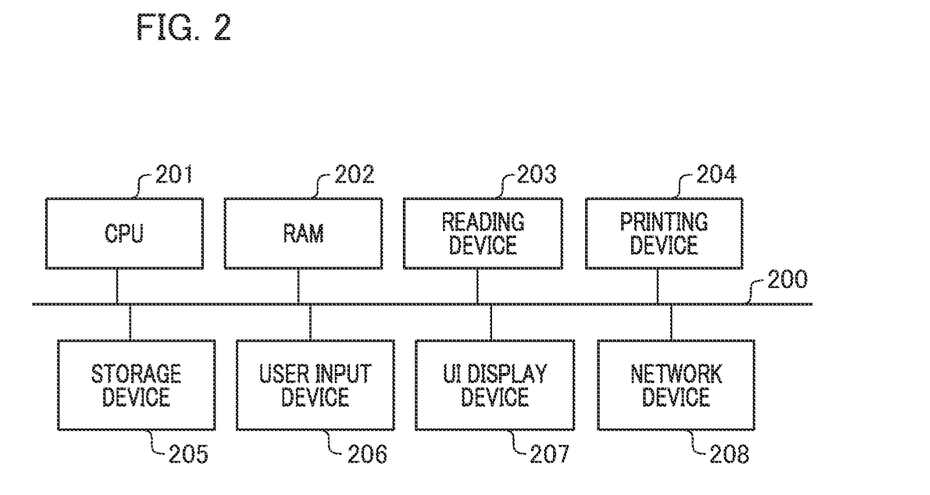
FIG. 2 is a diagram illustrating an example of a hardware configuration of an image forming apparatus.

FIG. 2 is a diagram illustrating an example of a hardware configuration of the image forming apparatus 102. The image forming apparatus 102 includes a CPU 201, a RAM 202, a reading device 203, a printing device 204, a storage device 205, a user input device 206, a UI display device 207, a network device 208, and a main bus 200.

The CPU 201 controls each process in the present embodiment. The RAM 202 provides a work area for the CPU 201. The reading device 203 reads an image. The printing device 204 prints an image. The storage device 205 (that may be an HDD, an NVRAM, or the like) stores a program or various setting values. The user input device 206 is a device for a user to input a command. The UI display device 207 displays a screen. The network device 208 communicates with other devices through a network. The main bus 200 connects each component.

The network device 208 can be connected to the Internet through a carrier network by the SIM card built into the image forming apparatus 102, and can access, for example, the management server 101. Meanwhile, in the present embodiment, unless otherwise stated, the image forming apparatus 102 is configured such that the CPU 201 controls various devices through the main bus 200. In addition, the UI display device 207 may also serve as the user input device 206 such as a touch panel display.

Figure 3:
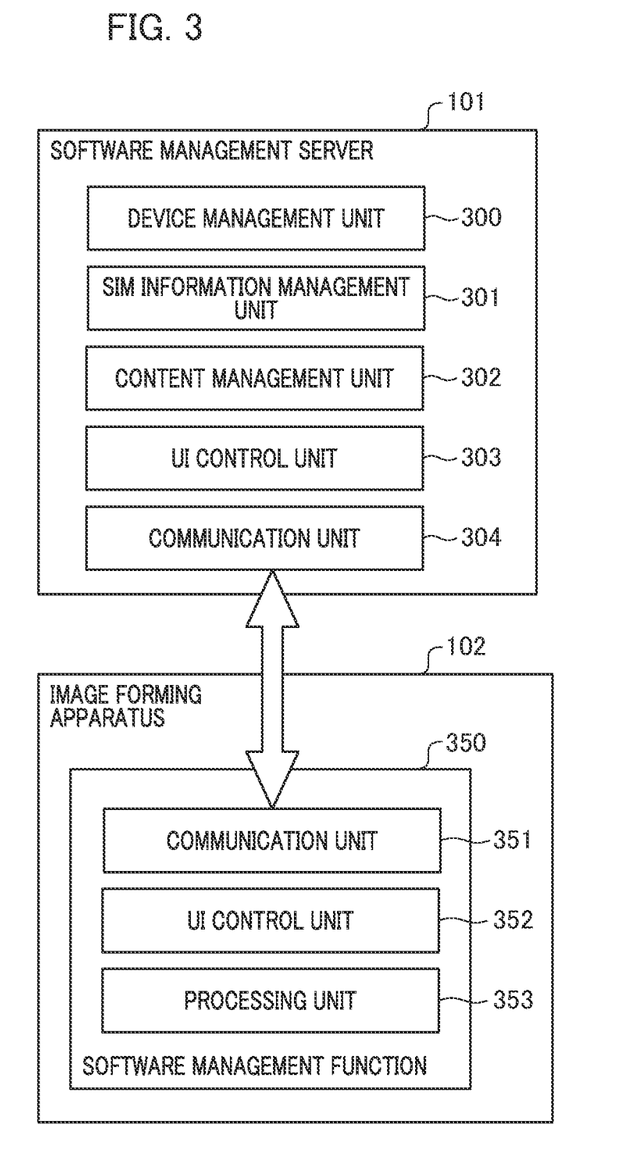
FIG. 3 is a diagram illustrating an example of software configurations of a server and the image forming apparatus.

FIG. 3 is a diagram illustrating an example of software configurations of the server and the image forming apparatus. The software update system is constituted by the management server 101 and the image forming apparatus 102. Meanwhile, the hardware configuration of the management server 101 is the same as the configuration of a general computer, and thus description thereof will be omitted. Each functional unit shown in FIG. 3 is realized by the CPU, which each of the management server 101 and the image forming apparatus 102 has, by executing a control program.

The management server 101 is a server that manages software of the image forming apparatus 102, and includes a device management unit 300, a SIM information management unit 301, a content management unit 302, a UI control unit 303, and a communication unit 304.

The device management unit 300 manages information of a plurality of image forming apparatuses 102 which are connected to the management server 101. Table A shows an example of device information which is managed by the device management unit 300.

TABLE A

| Device ID | Firmware information | Application information | SIM contract |
|---|---|---|---|
| DC001 | 15.18 | app01_1.0, app02_2.0 | Plan-D |
| DC002 | 18.01 | app01_1.0 | Plan-K |
| DC003 | 18.01 | app02_2.0 | Plan-V |

Table A is a device information table which is managed by the SIM information management unit 301 of the management server 101. In the device information table, a device ID, firmware information, application information, and a SIM contract are managed.

The device ID is an identifier for uniquely specifying the image forming apparatus 102. The device ID is, for example, the serial number of the image forming apparatus 102 or the like. Meanwhile, the device ID may be a universally unique identifier (UUID) or the like insofar as the image forming apparatus 102 can be specified.

The firmware information is information such as version information on firmware which is applied to the image forming apparatus 102.

The application information is information on an application which is installed in the image forming apparatus 102. Examples of the stored application information include an application name, application version information, and the like. Meanwhile, there is no limitation thereto, and an identifier for specifying an application such as an application ID may also be managed together with the application information.

The SIM contract is information about the kind of contract under which the SIM card mounted in the image forming apparatus 102 is permitted to communicate. The SIM contract may be managed as one contract for each carrier that provides the SIM card, or may be a plurality of contracts for each carrier. Meanwhile, contract information which is managed by the SIM contract is the main key of a SIM contract information table to be described later in the SIM information management unit 301. Meanwhile, the SIM contract in Table A is represented by a short character string, but there is no limitation thereto, and a key such as a UUID may be used. In this way, the SIM in the present embodiment is an example of a specific moving object, and the SIM contract is an example of a contract of specific mobile communication.

The information which is managed in Table A is assumed to be registered when the image forming apparatus 102 is delivered to a user, but there is no limitation thereto. In addition, the information which is managed in the device information table is not limited to the items in Table A, and the number of items may be increased or decreased as necessary. For example, model information or the like of the image forming apparatus 102 may be managed.

FIG. 3 will be described again. The SIM information management unit 301 manages information on the SIM which is mounted in the image forming apparatus 102. Table B shows an example of SIM management information which is managed by the SIM information management unit 301.

TABLE B

| SIM contract | Regional information | Late-night time (start) | Late-night time (end) |
|---|---|---|---|
| Plan-D | JP | 2:00 | 6:00 |
| Plan-K | JP | 2:00 | 6:00 |
| Plan-V | US | 1:00 | 5:00 |

Table B is a SIM information table which is managed by the SIM information management unit 301 of the management server 101. In the SIM information table, a SIM contract, regional information, a late-night time (start), and a late-night time (end) are managed.

The SIM contract is information about the kind of contract under which the SIM card mounted in the image forming apparatus 102 is permitted to communicate. The SIM contract may be managed as one contract for each carrier that provides the SIM card, or may be a plurality of contracts for each carrier. Meanwhile, the SIM contract in Table B is represented by a short character string, but there is no limitation thereto, and a key such as a UUID may be used.

The regional information is information indicating which regional carrier the SIM is contracted with in the world.

The late-night time (start) is the start time of a late-night charge in a case where a carrier sets the communication cost to be low as a late-night charge in the SIM contract. Meanwhile, in the present embodiment, it is described as a 24-hour clock. In addition, if the late-night time (start) is managed, it is managed by a local time according to a region which is managed by the regional information.

The late-night time (end) is the end time of a late-night charge in a case where a carrier sets the communication cost to be low as a late-night charge in the SIM contract. Meanwhile, in the present embodiment, it is described as a 24-hour clock. In addition, if the late-night time (end) is managed, it is managed by a local time according to a region which is managed by the regional information.

The example of Table B shows that the carrier providing the contract of Plan-D sets two o'clock to six o'clock at late-night as a late-night time slot and provides the communication cost at a low price. Meanwhile, in the present embodiment, the late-night time (start) and the late-night time (end) are managed by a 24-hour clock, but there is no limitation thereto and they may be managed by a 12-hour clock. In addition, the information which is managed in the SIM information table is not limited to the items in Table B, and the number of items may be increased or decreased as necessary. For example, the late-night time (start) and the late-night time (end) may be managed as one item as the late-night time slot.

Meanwhile, the late-night time slot in the present embodiment is an example of a predetermined time slot in which the communication cost is lower than in other time slots among a plurality of time slots determined depending on the contract for specific mobile communication, and more specifically an example of a late-night charge time slot.

FIG. 3 will be described again. The content management unit 302 manages firmware or an application (hereinafter, generally referred to as software) that can be applied to the image forming apparatus 102. The content management unit 302 stores the entity of the software in the storage device 205 of the management server 101. Meanwhile, the storage device 205 which is accessed by the content management unit 302 may be an HDD, an NVRAM, or the like in the management server 101, or may be in an external storage device separate from the management server 101. Table C shows an example of data which is managed by the content management unit 302.

TABLE C

| Content ID | Type | Version | File name |
| --- | --- | --- | --- |
| Firm1518 | Firmware | 15.18 | Firmware1518.zip |
| Firm1801 | Firmware | 18.01 | Firmware1801.zip |
| App01-100 | Apps | 1.00 | App01__1.0.zip |
| App02-200 | Apps | 2.00 | App02__2.0.zip |

Table C is a content information table which is managed by the content management unit 302 of the management server 101. The content information table is constituted by a content ID, a type, a version, and a file name.

The content ID is an identifier for uniquely specifying each file which is managed by the content management unit 302. The content ID is issued after being associated with a file during content registration. The content ID may be defined by a UUID or the like.

The type is an item indicating what kind of content the type of content managed by the content management unit 302 is. In Table C, firmware or an application is stored. Meanwhile, the type of content is not limited to the example of Table C, and may be, for example, a type such as a setting value.

The version indicates which version the target content has in a case where the version is allocated to the content.

The file name is a file name of content which is managed in the content information table. The file name can be registered with any character string and any extension. In the example of Table C, ZIP format files of content type+version or content ID+version are registered. Meanwhile, there is no limitation thereto, and the portion of the character string may be year, month, day, hour, minute, and second, or the file format may also be something other than a compressed file.

Although the content information table has been described in the items in Table C in the present embodiment, there is no limitation thereto, and the number of items may be increased or decreased as necessary. For example, there may be an update date and time of content or the like.

FIG. 3 will be described again. The UI control unit 303 is a functional unit in which the management server 101 provides a screen for device registration (not shown), a screen for content registration (not shown), and a screen for adding or deleting a SIM contract or the like (not shown).

The communication unit 304 communicates with the outside through the image forming apparatus 102 or a network. For example, the communication unit 304 receives a software update confirmation request or the like from the image forming apparatus 102 through a carrier network, and transmits the request to the device management unit 300. In addition, the communication unit 304 receives a software acquisition request from the image forming apparatus 102, and transmits a request for acquisition of target content to the content management unit 302.

The image forming apparatus 102 has a software management function 350 for performing update confirmation of software or acquisition and application of software with respect to the management server 101. The software management function 350 includes a communication unit 351, a UI control unit 352, and a processing unit 353.

The communication unit 351 communicates with the management server 101 through a carrier network by the network device 208.

Figure 4A:
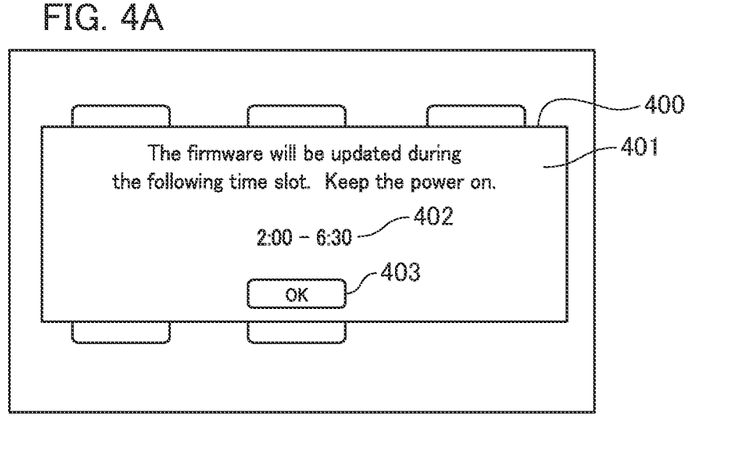
FIGS. 4A, 4B, and 4C are diagrams illustrating an example of UIs of the image forming apparatus.

If the management server 101 notifies that the software needs to be updated, the UI control unit 352 displays an update notification screen 400 (see FIG. 4A). The update notification screen 400 will be described later. If the software needs to be updated, the UI control unit 352 provides messages indicating a predetermined time slot and that software for updating has to be in a state in which downloading using the SIM card is possible. Therefore, the UI control unit 352 in the present embodiment is an example of a providing unit configured to provide these messages.

Here, examples of the state in which downloading is possible include a state in which the power supply of the image forming apparatus 102 is turned on, a state in which a communication mode using specific mobile communication is enabled, and a state in which the module is not removed from the image forming apparatus 102. However, there is no limitation thereto.

The processing unit 353 periodically confirms whether the software is updated to the management server 101 through the communication unit 351. If the software is updated, a software acquisition time is acquired from the management server 101 through the communication unit 351, and the UI control unit 303 is instructed to display the update notification screen 400.

Figure 4B:
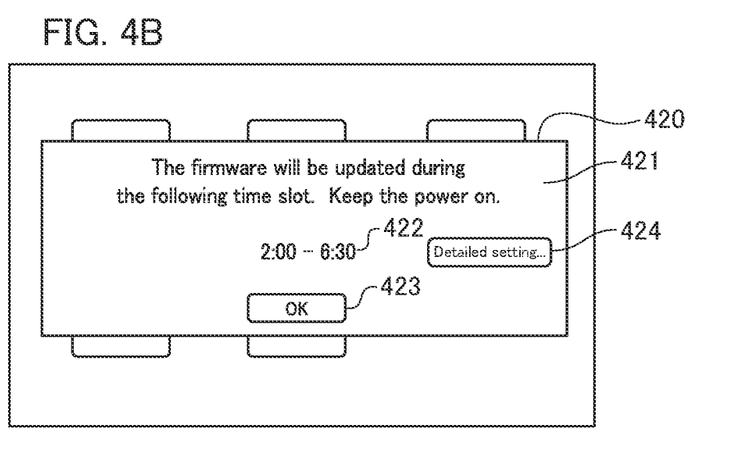
Figure 4C:
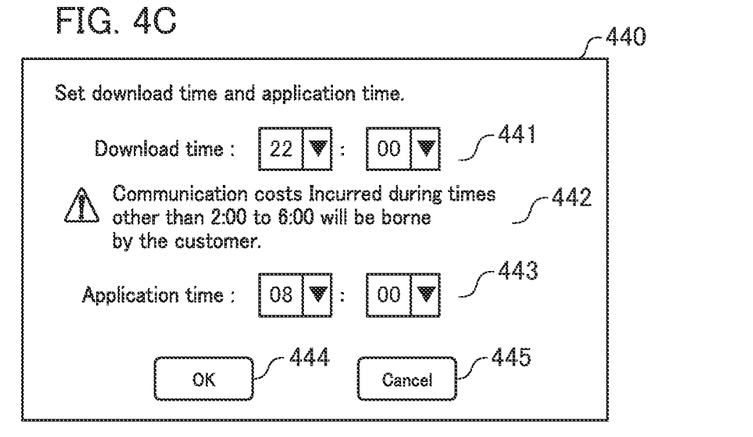

FIGS. 4A, 4B, and 4C are diagrams illustrating an example of UIs of the image forming apparatus. FIG. 4A is an example of the update notification screen 400 displayed in the image forming apparatus 102 in the first embodiment. The update notification screen 400 is constituted by an update message unit 401, an update time display unit 402, and an OK button 403.

The update message unit 401 is a functional unit notifies a user that the software has been updated and that the power supply of the image forming apparatus 102 remains turned on for the update.

The update time display unit 402 is a functional unit that displays a late-night time slot in which the communication charge of the SIM acquired from the management server 101 through the communication unit 351 becomes lower. In the late-night time slot, for example, the late-night time (start) and the late-night time (end) in Table B are acquired displayed.

The OK button 403 is a button for closing the displayed update notification screen 400. If a user confirms the update notification from the image forming apparatus 102, the user presses the OK button 403.

Meanwhile, since the update notification screen 400 shown in FIG. 4A is an example, the number of functional units and the like may be increased or decreased as necessary. For example, there may be a list display unit or the like that displays a list of software to be updated. In addition, although description has been made on the assumption that the update notification screen 400 is displayed on the UI display device 207 of the image forming apparatus 102 in the present embodiment, there is no limitation thereto, and a screen which is prepared by a built-in Web server (not shown) may be displayed on a browser.

Figure 5:
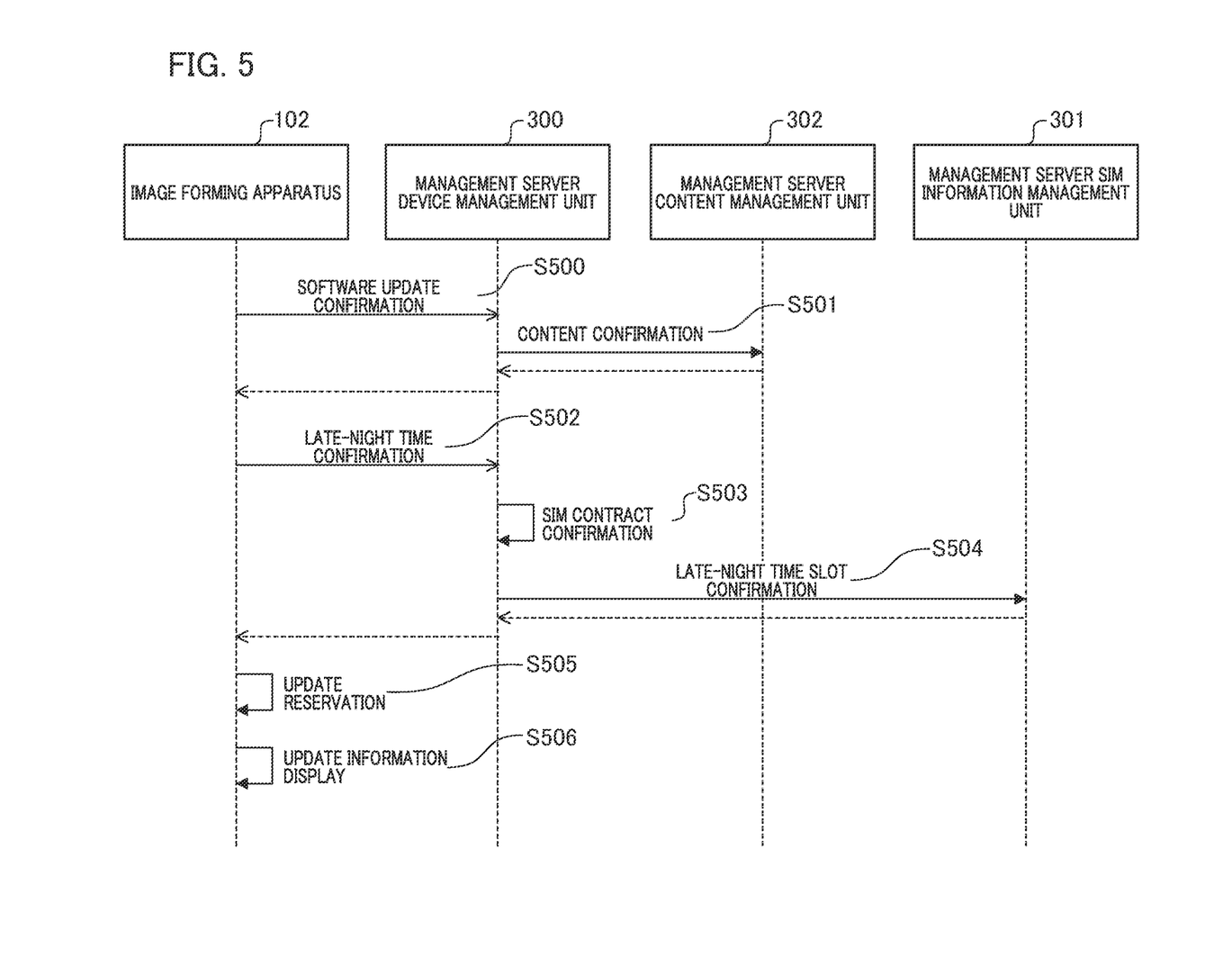
FIG. 5 is a diagram illustrating a sequence of overall processing of the software update system.

FIG. 5 is a diagram illustrating a sequence of overall processing in the software update system. The processing shown in FIG. 5 is managed using an internal timer or time by the processing unit 353 of the image forming apparatus 102, and is executed periodically.

If it is time to confirm software update, the image forming apparatus 102 issues a request for update confirmation of software to the management server 101 (S500). When the request is issued, the image forming apparatus 102 transmits a device ID for specifying itself and software information applied to itself. If the update confirmation request is received, the management server 101 transmits the request to the device management unit 300 through the communication unit 304. The device management unit 300 inquires the content management unit 302 about the latest version of the software applied to the image forming apparatus 102 on the basis of the update confirmation request (S501). If there is software to be updated after that, the fact that there is software update together with the software to be updated is returned to the image forming apparatus 102. Meanwhile, at this time, the content ID to be acquired or the like may be returned as information on the software to be updated.

The image forming apparatus 102 having received the fact that there is update requests the management server 101 for late-night time as update time (S502). Meanwhile, in order to specify the image forming apparatus 102 that is a request source even when the request for late-night time is made, the device ID is transmitted together.

The management server 101 having received the late-night time acquisition request transmits the request to the device management unit 300 through the communication unit 304. The device management unit 300 confirms the SIM contract of a target device on the basis of the device ID of the late-night time acquisition request (S503). Next, the device management unit 300 acquires the late-night time (start) and the late-night time (end) corresponding to the SIM contract from the SIM information management unit 301 (S504), and returns the acquired late-night time to the image forming apparatus 102.

The image forming apparatus 102 having received the late-night time makes a software update reservation in its own device (S505). A software update process reserved in S505 will be described later with reference to FIG. 6. Meanwhile, the update time of the update reservation at this time may be managed in, for example, the processing unit 353, or may be managed using the internal timer of the image forming apparatus 102.

Thereafter, the image forming apparatus 102 instructs the UI control unit 352 to display the update notification screen 400. Meanwhile, the time slot which is displayed by the update time display unit 402 displays the late-night time acquired in S504.

The above is the software update confirmation process of the software update system in the present embodiment. Meanwhile, although the transmission of its own software information during the update request has been described in the present embodiment, it is only required that the management server 101 can determine software information of the image forming apparatus 102 during the update confirmation, and there is no limitation thereto. For example, a method of transmitting software information to the management server 101 separately from the update confirmation process or a method of transmitting only changed points each time there is a change may be used. In addition, although the display of the late-night time slot in the image forming apparatus 102 has been described in the present embodiment, there is no limitation thereto, and the management server 101 or the image forming apparatus 102 may determine time and transmit execution time, for example, within the range of the late-night time slot.

Figure 6A:
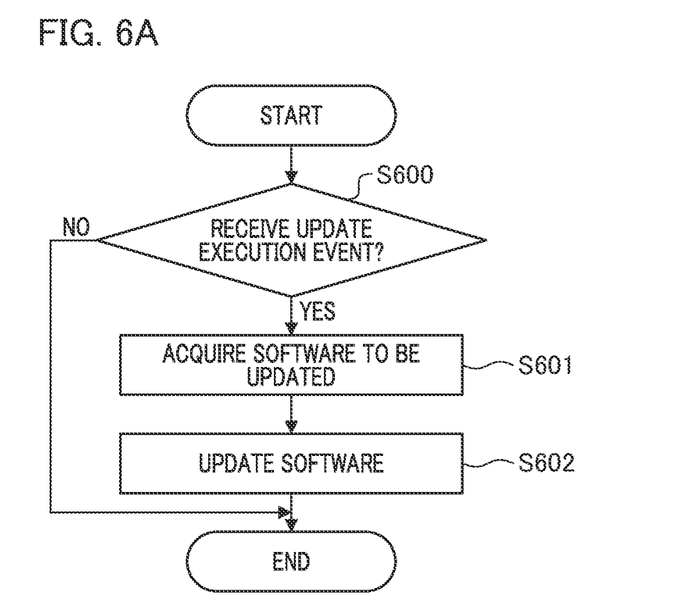
FIGS. 6A and 6B are diagrams illustrating a software update flow of the image forming apparatus.
Figure 6B:
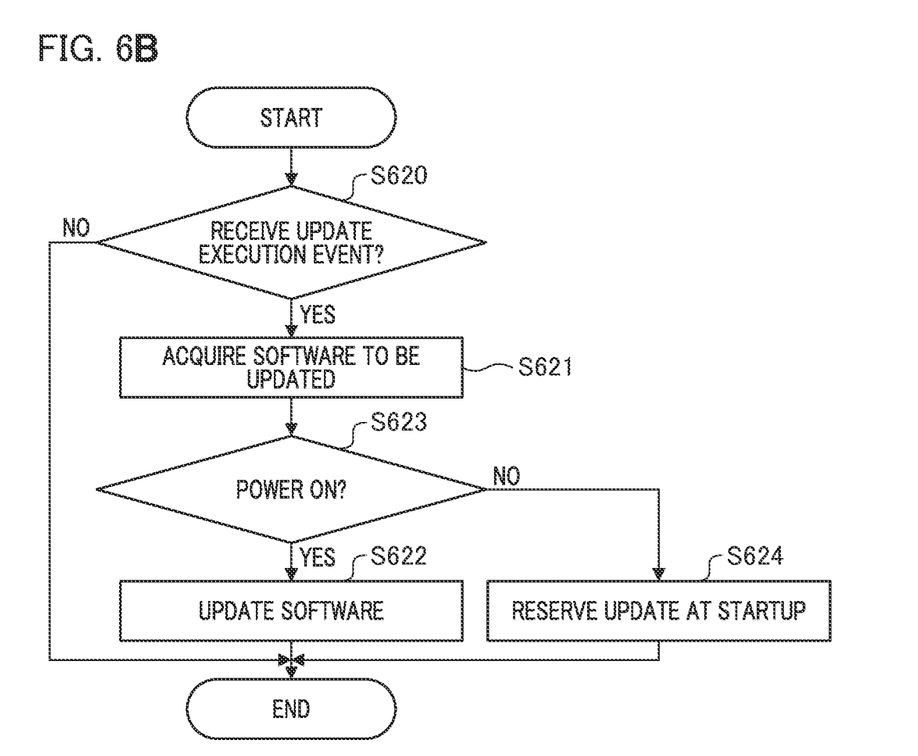

FIGS. 6A and 6B are diagrams illustrating a software update flow of the image forming apparatus 102. FIG. 6A shows a software update flow of the image forming apparatus 102 in the first embodiment. The processing shown in FIG. 6A is executed using the time reserved for update or the internal timer by the processing unit 353 of the image forming apparatus 102. The update reservation is performed, for example, in S505 of FIG. 5.

S600 is a process of determining whether the image forming apparatus 102 has received an internal event when the update reservation time has come. The process transitions to S601 if the software update is received in the internal event, and this process ends if the event is other than the software update.

S601 is a process of acquiring the software to be updated from the management server 101. When the software to be updated is acquired, the software is identified and acquired using the content ID registered during the update reservation.

S602 is a process of applying the acquired software to the image forming apparatus 102. Meanwhile, if there are a plurality of pieces of software to be updated, the software may be acquired collectively in S601 and be applied collectively in S602. Alternatively, the acquisition and update processes of S601 and S602 may be repeated as many times as there are pieces of software.

Hereinbefore, according to the present embodiment, if the software needs to be updated, the software of the image forming apparatus can be updated while the communication cost of a manufacturer is suppressed by using the late-night time slot in which the communication charge is low.

Second Embodiment

In the first embodiment, description has been made of the software update method of the image forming apparatus while the communication cost of a manufacturer is suppressed by limiting the software update to the late-night time slot in which the communication charge is low and notifying a user that the power supply is turned on in the target time slot. However, in the first embodiment, since the user is only notified that the update is performed at late-night, there is the possibility of the power supply being turned off. In this case, it is not possible to update software with security issues or serious bugs.

Consequently, in the present embodiment, a method of providing a degree of importance to update of software and making it possible to update software with a high degree of importance insofar as possible will be described. Meanwhile, in a second embodiment, the description of the drawings having the same configuration and the same content as those in the first embodiment will be omitted, and only the drawings having differences will be described.

Table D shows an example of data which is managed by the content management unit 302.

TABLE D

| Content ID | Type | Version | File name | Degree of importance |
|---|---|---|---|---|
| Firm1518 | Firmware | 15.18 | Firmware1518.zip | Low |
| Firm1801 | Firmware | 18.01 | Firmware1801.zip | High |
| App01-100 | Apps | 1.00 | App01_1.0.zip | Low |
| App02-200 | Apps | 2.00 | App02_2.0.zip | Low |

Table D is a content information table which is managed by the content management unit 302 of the management server 101. In Table D, the degree of importance is added in addition to the information in Table C. Meanwhile, in the description of each column in Table D, the same as in Table C will be omitted.

The degree of importance indicates how much each file managed by the content management unit 302 is to be updated. For example, in the case of coping with serious bugs or security issues and applying them as soon as possible, the degree of importance is set to be high. On the other hand, in the case of optional updates as in updates such as adding a new function or coping with a minor bug, the degree of importance is set to be low. Meanwhile, in Table D, the degree of importance is only high or low, but there is no limitation thereto, and, for example, a plurality of stages may be prepared and the degree of importance may be finely allocated according to the content.

Figure 7:
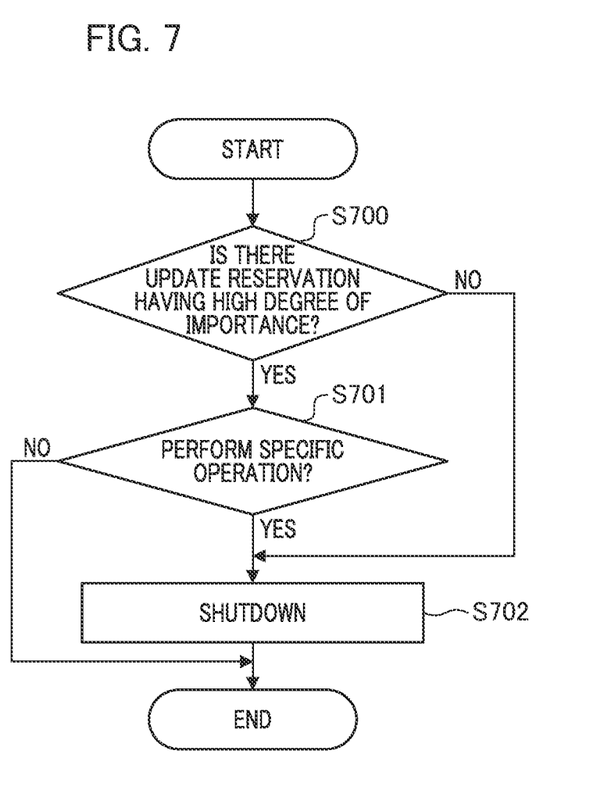
FIG. 7 is a diagram illustrating a power supply cutoff process flow of the image forming apparatus in a second embodiment.

FIG. 7 is a diagram illustrating a power supply cutoff process flow of the image forming apparatus 102 in the second embodiment. The power supply cutoff process is a process which is performed by pressing the power supply button (not shown) of the image forming apparatus 102 in a power-on state.

S700 is a process of determining whether the image forming apparatus 102 has a software update reservation or includes an update reservation with a high degree of importance if there is an update reservation. The process transitions to S701 if there is a software update reservation with a high degree of importance, and the process transitions to S702 if there is no software update reservation or the degree of importance of the update reservation is not high.

S701 is a determination process in a case where there is a reservation with a high degree of importance of software update, and it is determined whether a specific operation for shutting down the image forming apparatus 102 has been performed by a user. Examples of the specific operation include an operation of continuing to press the power supply button for ten seconds or longer, an operation of sequentially pressing other hard keys before the power supply button is pressed, an operation of simultaneously pressing the power supply button and another button, and the like. If the specific operation is performed, the process transitions to S702 and shuts down. On the other hand, if the specific operation is not performed, the process ends without shutting down.

Meanwhile, in the present embodiment, the CPU 201 functions as an example of a power supply operation unit configured to determine operations of turning on and turning off the power supply (power-on and power-off operations) of the image forming apparatus 102. The setting of the specific operation may be set in advance, but there is no limitation thereto, and the UI control unit 352 may display a setting screen and a user may set the specific operation on the setting screen. Thereafter, the CPU 201 determines whether the user has performed the specific operation.

S702 is a shutdown process for turning off the power supply of the image forming apparatus 102.

Meanwhile, in the process flow of FIG. 7, if there is update of a high degree of importance, the process flow is ended as it is unless the specific operation is performed, but a user may be notified that there is software update of a high degree of importance. In addition, although the power supply of the main body of the image forming apparatus 102 cannot be turned off, display of the UI display device 207 may be turned off or transition to a power saving mode with low power consumption.

Hereinbefore, according to the present embodiment, software having a high degree of importance can be updated more by making it difficult to turn off the power supply of the image forming apparatus 102 in accordance with the degree of importance of software update.

Third Embodiment

In the first and second embodiments, software can be updated more in the late-night time slot by telling a user to keep the power supply on or making it difficult to turn off the power supply if there is software update. However, since there is a unit configured to turn off the power supply in both the first and second embodiments, it is difficult to update software in the late-night time slot.

Consequently, in the present embodiment, a unit configured to be capable of downloading software in the late-night time slot even if the power supply is turned off will be described. Meanwhile, in a third embodiment, the description of the drawings having the same configuration and the same content as those in the first and second embodiments will be omitted, and only the drawings having differences will be described.

FIG. 6B shows a software update flow of the image forming apparatus 102 in the present embodiment. The processing shown in FIG. 6B is executed at a time reserved for update by the processing unit 353 of the image forming apparatus 102 or a time determined using the internal timer. Meanwhile, in the present embodiment, some devices such as the storage device 205 of the image forming apparatus 102 and the network device 208 including a SIM card can be operated by a power supply (not shown) separate from the power supply of the main body. For example, the main body secures the power supply with a power supply cable, but the storage device 205 and the network device 208 enable the update process using a built-in battery or the like if the power supply cannot be secured.

In this way, in the present embodiment, there are at least two power supplies. That is, there are at least a first power supply that brings the main body of the image forming apparatus 102 into operation using a power supply cable and a second power supply such as a battery that is a power supply different from the first power supply and brings the processing unit 353 of the software management function 350 into operation.

S620 to S622 in FIG. 6B are the same as S600 to S602 in FIG. 6A, and thus description thereof will be omitted.

S623 is a process of confirming whether the power supply of the image forming apparatus 102 is turned off, that is, the image forming apparatus 102 including a SIM card is operated by another power supply such as a battery. In S623, the process transitions to S622 if the power supply is turned on, and the process transitions to S624 if the battery is driven.

In S624, software is not updated immediately, and the process of an update reservation at startup in which software is only acquired is performed. The process of an update reservation at startup is a process of making an update reservation so as to update software at a timing when the image forming apparatus 102 is started up, that is, a timing when the power supply is turned on. With this process, software can be updated at a timing when the power supply is turned on.

Meanwhile, in FIG. 6B, it is assumed in S621 that the software acquired in the storage device 205 is stored, but if the storage area of software to be updated can be secured in the SIM card, the software may be stored in the SIM card.

Hereinbefore, according to the present embodiment, even if the power supply is turned off, only a device required for a process of acquiring software is battery-driven, and thus only the process of acquiring software can be performed in the late-night time slot.

Fourth Embodiment

In the first to third embodiments, a method of acquiring the start and end times of the late-night time managed by the management server 101 as a fixed value and acquiring software in the late-night time slot when the communication charge is low has been described. However, the late-night time slot is a value which is set by a carrier that provides a SIM card, and may be changed due to the carrier's convenience. In that case, since an operation is performed at a time before the change, it becomes impossible to update software in a time slot when the communication charge is low. Consequently, in the present embodiment, a system that can cope with even a case where a carrier changes the late-night time slot will be described. Meanwhile, in a fourth embodiment, the description of the drawings having the same configuration and the same content as those in the first to third embodiments will be omitted, and only the drawings having differences will be described.

Table E shows an example of SIM management information which is managed by the SIM information management unit 301.

TABLE E

| SIM contract | Regional information | Late-night time (start) | Late-night time (end) | Information source |
|---|---|---|---|---|
| Plan-D | JP | 2:00 | 6:00 | https://d.com/late-night-rate |
| Plan-K | JP | 2:00 | 6:00 | https://d.com/late-night-rate |
| Plan-V | US | 1:00 | 5:00 | https://d.com/late-night-rate |

Table E is a SIM information table which is managed by the SIM information management unit 301 of the management server 101, and manages a SIM contract, regional information, a late-night time (start), a late-night time (end), and an information source. Meanwhile, in the description of each column in Table E, the same items as in Table B are omitted.

The information source manages a uniform resource locator (URL) that can acquire information on the late-night time slot which is prepared by a carrier that provides a SIM card. This URL is, for example, an application programming interface (API) on the carrier side, and information on the late-night time slot can be easily acquired by selecting this API.

Figure 8:
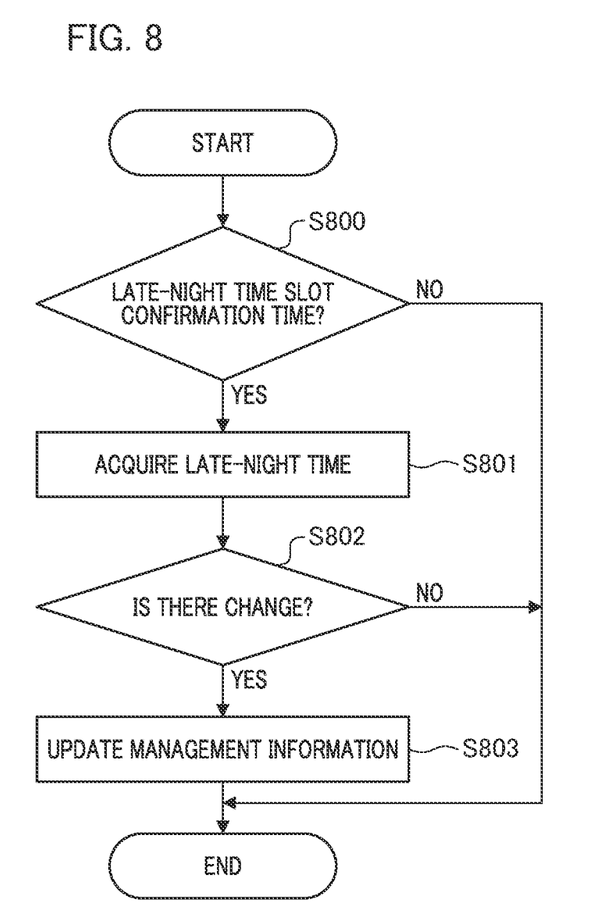
FIG. 8 is a diagram illustrating a software update flow of the image forming apparatus in a fourth embodiment.

FIG. 8 is a diagram illustrating a software update flow of the image forming apparatus 102 in the fourth embodiment. A late-night time update process is periodically performed by the SIM information management unit 301. Meanwhile, in the update process, it is only required that the change in the late-night time of the carrier can be detected. For example, an update event may be transmitted from the carrier side, and the update time may be confirmed using the update event as a trigger.

S800 is a process of determining whether the SIM information management unit 301 has reached the periodical time of the late-night time update process. The process transitions to S801 if the update time is reached, and the process ends if the update time is not reached.

S801 is a process in which the SIM information management unit 301 confirms the late-night time with respect to a carrier on the basis of the information source which is managed in the SIM information table.

S802 is a process in which the SIM information management unit 301 compares the late-night time (start) and the late-night time (end) which are managed in the SIM information table with the time acquired in S801, and determines where there is a change. The process transitions to S803 if there is a change, and the process ends if there is no change.

S803 is a process in which the SIM information management unit 301 updates the late-night time (start) and the late-night time (end) which are managed in the SIM information table to new values. With the above update process, it is possible to cope with even a case where a carrier changes the late-night time slot.

Meanwhile, in FIG. 8, although the value of the SIM information table is only updated, the image forming apparatus 102 may have been reserved depending on a timing when the late-night time update is performed. Therefore, after the management information is updated, the software management function 350 of the image forming apparatus 102 may be notified that there has been a change, and the update reservation time may be changed as necessary.

Hereinbefore, according to the present embodiment, the late-night time slot of the management server is updated periodically or at a timing when the late-night time is updated in the carrier. Therefore, it is possible to update the software of the image forming apparatus 102 after coping with the change of the late-night time slot of the carrier.

Fifth Embodiment

In the first to fourth embodiments, a method of acquiring software in the late-night time slot in which the communication charge is low using the late-night time slot managed by the management server 101 has been described. However, some users may have to perform update during the daytime rather than at late night. Consequently, in the present embodiment, a system in which the communication charge is borne by a user (customer) and software can be updated outside the late-night time slot will be described. Meanwhile, in a fifth embodiment, the description of the drawings having the same configuration and the same content as those in the first to fourth embodiments will be omitted, and only the drawings having differences will be described.

FIG. 4B shows an example of an update notification screen 420 of the image forming apparatus 102 in the present embodiment. The update notification screen 420 is constituted by an update message unit 421, an update time display unit 422, an OK button 423, and a detailed setting button 424. Meanwhile, 420 to 423 in FIG. 4B are the same as 400 to 403 in FIG. 4A, and thus description thereof will be omitted.

The detailed setting button 424 is a button to be pressed if the late-night time slot shown on the update time display unit 422 is desired to be edited. If the detailed setting button 424 is pressed, the screen of FIG. 4C to be described later is displayed, and any update time can be set. If any update time is set in FIG. 4C, the value of the update time display unit 422 is updated.

FIG. 4C is an example of a time change screen 440 which is displayed when the detailed setting button 424 is pressed. The time change screen 440 is constituted by a download time setting unit 441, a message display unit 442, an application time setting unit 443, an OK button 444, and a cancel button 445.

The download time setting unit 441 functions as a download time setting unit configured to set a time (download time) when software update is downloaded. In the download time setting unit 441, the start time of the late-night time slot which is managed by the management server 101 is set as an initial value. Meanwhile, although the initial value is described to display the start time, there is no limitation thereto, and the management server 101 or the image forming apparatus 102 may determine the time and transmit the execution time, for example, within the range of the late-night time slot.

The message display unit 442 displays a predetermined message in a case where the time is changed by the download time setting unit 441 and is out of the range of the late-night time slot. The message display unit 442 displays, as a predetermined message, that the communication cost in a case where the setting is performed outside the late-night time slot will be borne by a user, for example, as in the example of FIG. 4C.

The application time setting unit 443 is a functional unit that sets a time (application time) when the updated software is applied. The same value as the download time setting unit 441 is displayed as an initial value, indicating that the download is executed as soon as it is completed.

The OK button 444 is a button for determining a change in the download time setting unit 441 and the application time setting unit 443. If the OK button 444 is pressed, the UI control unit 352 sets the processing unit 353 to download software with the value of the download time setting unit 441. Similarly, the application time of software is set from the value of the application time setting unit 443. Thereafter, the UI control unit 352 displays the download time and the application time and then displays the update notification screen 420.

The cancel button 445 is a button for stopping the change of the download time setting unit 441 and the application time setting unit 443. If the cancel button 445 is pressed, the UI control unit 352 changes nothing and displays the update notification screen 420 of FIG. 4B.

FIG. 4C in the present embodiment is an example, and there may be increase or decrease in control as necessary. For example, if communication occurs when software is applied, a display unit similar to the message display unit 442 may be prepared under the application time. In addition, the processing of each functional unit is also described as an example, and there is no limitation thereto. For example, in the present embodiment, the OK button 444 only changes the settings in the image forming apparatus 102, but if the management server 101 manages the update time or the like, the management server 101 may be notified of the time change.

As described above, each screen of FIGS. 4B and 4C allows a user to reserve the download process at any time. Meanwhile, although description has been made on the assumption that the time setting screen is displayed on the UI display device 207 of the image forming apparatus 102 in the present embodiment, there is no limitation thereto, and a screen which is prepared by a built-in Web server (not shown) may be displayed on a browser.

As described above, by changing the settings of download and application time in the image forming apparatus 102, it is possible to update software outside the late-night time slot after a user is notified that the communication charge is borne by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110377, filed Jul. 1, 2021, which is hereby incorporated by reference wherein in its entirety.

What is claimed is:

1. An image processing apparatus provided with a module that holds identification information capable of specifying a subscriber who has entered a contract for specific mobile communication, the image processing apparatus comprising:
   a memory storing instructions; and
   a processor executing the instructions causing the image processing apparatus to:
      provide, if a software needs to be updated, a message indicating a predetermined time slot and that the image processing apparatus has to be in a state in which downloading the software for updating using the contract for specific mobile communication is possible, and
      download the software for updating in the predetermined time slot using the contract for specific mobile communication,
      wherein the predetermined time slot is at least a portion of a time slot which is determined depending on the contract for the specific mobile communication.

2. The image processing apparatus according to claim 1, wherein the state in which downloading is possible is at least one of a state in which a power supply of the image processing apparatus is turned on, a state in which a communication mode using the contract for specific mobile communication is enabled, and a state in which the module is not removed from the image processing apparatus.

3. The image processing apparatus according to claim 1, wherein the time slot which is determined depending on the contract for the specific mobile communication is a late-night charge time slot.

4. The image processing apparatus according to claim 1, wherein the processor further executes an instruction causing the image processing apparatus to determine on and off operations of a power supply, and
   wherein, in a case where the power supply is turned off in the time slot which is determined depending on the contract for the specific mobile communication, the processor makes it more difficult to turn off the power supply than in a case where the power supply is turned off in a time slot different from the time slot which is determined depending on the contract for the specific mobile communication.

5. The image processing apparatus according to claim 1, further comprising a power supply for bringing the processor into operation,
   wherein the power supply includes
      a first power supply that brings a main body of the image processing apparatus into operation, and
      a second power supply that is a power supply different from the first power supply and brings the processor into operation.

6. The image processing apparatus according to claim 1, wherein the processor confirms the time slot which is determined depending on the contract for the specific mobile communication and updates the time slot which is determined depending on the contract for the specific mobile communication.

7. The image processing apparatus according to claim 1, wherein the processor further executes an instruction causing the image processing apparatus to set a time slot in which the software is downloaded,
   wherein the processor provides a predetermined message if the set time slot is different from the time slot which is determined depending on the contract for the specific mobile communication.

8. A method for controlling an image processing apparatus provided with a module that holds identification information capable of specifying a subscriber who has entered a contract for specific mobile communication, the method comprising:
   providing, if a software needs to be updated, a message indicating a predetermined time slot and that the image processing apparatus has to be in a state in which downloading the software for updating using the contract for specific mobile communication is possible; and
   downloading the software for updating in the predetermined time slot using the contract for specific mobile communication,
   wherein the predetermined time slot is at least a portion of a time slot which is determined depending on the contract for the specific mobile communication.

9. A non-transitory storage medium on which is stored a computer program related to a method for controlling an image processing apparatus provided with a module that holds identification information capable of specifying a subscriber who has entered a contract for specific mobile communication, the method comprising:
   providing, if a software needs to be updated, a message indicating a predetermined time slot and that the image processing apparatus has to be in a state in which downloading the software for updating using the contract for specific mobile communication is possible; and
   downloading the software for updating in the predetermined time slot using the contract for specific mobile communication,
   wherein the predetermined time slot is at least a portion of a time slot which is determined depending on the contract for the specific mobile communication.

* * * * *